US008002919B2

(12) United States Patent
Johnson et al.

(10) Patent No.: US 8,002,919 B2
(45) Date of Patent: *Aug. 23, 2011

(54) METHOD OF INSERTING Z-AXIS REINFORCING FIBERS INTO A COMPOSITE LAMINATE

(75) Inventors: David W. Johnson, San Diego, CA (US); Scott A. Garrett, San Diego, CA (US); James H. Hook, Alpine, CA (US); Stephen G. Moyers, Jamul, CA (US)

(73) Assignee: Ebert Composites Corporation, Chula Vista, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 12/140,121

(22) Filed: Jun. 16, 2008

(65) Prior Publication Data
US 2009/0071594 A1    Mar. 19, 2009

Related U.S. Application Data

(63) Continuation of application No. 11/530,859, filed on Sep. 11, 2006, now Pat. No. 7,387,147, which is a continuation of application No. 10/705,047, filed on Nov. 10, 2003, now Pat. No. 7,105,071, which is a continuation-in-part of application No. 09/922,053, filed on Aug. 2, 2001, now Pat. No. 6,645,333.

(60) Provisional application No. 60/281,838, filed on Apr. 6, 2001, provisional application No. 60/293,939, filed on May 29, 2001.

(51) Int. Cl.
*B32B 37/00*     (2006.01)
(52) U.S. Cl. .............. 156/91; 156/92; 156/148
(58) Field of Classification Search ............. 156/92, 156/91, 166, 148
See application file for complete search history.

(56) References Cited

U.S. PATENT DOCUMENTS
2,762,739 A    9/1956   Weiss
(Continued)

FOREIGN PATENT DOCUMENTS
DE      4342575 A1    4/1995
(Continued)

OTHER PUBLICATIONS

Stanley et al., Development and Evaluation of Stitched Sandwich Panels, NASA-CR 2001-211025, Jun. 2001.

*Primary Examiner* — Jeff Aftergut
(74) *Attorney, Agent, or Firm* — Stephen C. Beuerle; Procopio Cory Hargreaves & Savitch LLP

(57) ABSTRACT

A method of inserting z-axis reinforcing fibers into a multi-layer composite laminate. Layers of material made up of z-axis fiber and y-axis fibers are automatically transported into a z-fiber deposition machine having a housing with upper and lower surfaces. Z-axis apertures are formed in the respective upper and lower surfaces. An elongated solid rod having a tapered front tip is aligned in close proximity to the aperture in the bottom surface. The rod is first rotated by a motor and then actuated upwardly completely through the thickness of the layer of x-y material by an actuator. A first hollow tube having a z-axis is axially aligned with the aperture in the top surface and a fiber bundle is threaded downwardly through a first hollow tube to a position adjacent its bottom end. The z-fiber deposition machine has structure to feed a predetermined length of the fiber bundle downwardly through the first hollow tube so that it follows the pathway in the x-y material formed by the rod which is now withdrawn downwardly through the aperture in the bottom wall. The z-axis fiber is thus deposited into the x-y material. The top end of the z-axis fiber is then severed and the x-y material is then advanced a predetermined distance to complete the cycle and is, thus, set to be repeated.

18 Claims, 6 Drawing Sheets

U.S. PATENT DOCUMENTS

| | | | |
|---|---|---|---|
| 2,954,001 A | 9/1960 | Luxenburg | |
| 3,211,115 A | 10/1965 | Burillon et al. | |
| 3,241,508 A | 3/1966 | Chezaud et al. | |
| 3,328,218 A | 6/1967 | Noyes | |
| 3,647,606 A | 3/1972 | Notaro | |
| 3,761,345 A | 9/1973 | Smith | |
| 3,833,695 A | 9/1974 | Vidal | |
| 3,837,985 A | 9/1974 | Chase | |
| 3,870,580 A | 3/1975 | Belcher | |
| 3,948,194 A | 4/1976 | Gunold | |
| 3,993,523 A | 11/1976 | Hunt et al. | |
| 4,032,383 A | 6/1977 | Goldsworthy et al. | |
| 4,059,468 A | 11/1977 | Bouillon | |
| 4,077,340 A | 3/1978 | Braum et al. | |
| 4,080,915 A | 3/1978 | Bompard et al. | |
| 4,196,251 A * | 4/1980 | Windecker | 428/311.11 |
| 4,206,895 A | 6/1980 | Olez | |
| 4,218,276 A | 8/1980 | King | |
| 4,256,790 A | 3/1981 | Lackman et al. | |
| 4,291,081 A | 9/1981 | Olez | |
| 4,299,871 A | 11/1981 | Forsch | |
| 4,331,091 A * | 5/1982 | Parker et al. | 112/475.08 |
| 4,335,176 A | 6/1982 | Baumann | |
| 4,350,728 A | 9/1982 | Huang et al. | |
| 4,495,231 A | 1/1985 | Laskaris et al. | |
| 4,495,235 A | 1/1985 | Tesch | |
| 4,498,941 A | 2/1985 | Goldsworthy | |
| 4,506,611 A | 3/1985 | Parker et al. | |
| 4,528,051 A | 7/1985 | Heinze et al. | |
| 4,541,349 A | 9/1985 | Inoue | |
| 4,571,355 A | 2/1986 | Elrod | |
| 4,628,846 A | 12/1986 | Vives | |
| 4,752,513 A | 6/1988 | Rau et al. | |
| 4,761,871 A | 8/1988 | O'Conner et al. | |
| 4,808,461 A | 2/1989 | Boyce et al. | |
| 4,854,250 A | 8/1989 | Stuvecke et al. | |
| 4,913,937 A | 4/1990 | Engdahl et al. | |
| 4,917,756 A | 4/1990 | Cahuzac et al. | |
| 4,955,123 A | 9/1990 | Lawton et al. | |
| 4,963,408 A | 10/1990 | Huegli | |
| 5,055,242 A | 10/1991 | Vane | |
| 5,095,833 A | 3/1992 | Darrieux | |
| 5,186,776 A | 2/1993 | Boyce et al. | |
| 5,286,320 A | 2/1994 | McGrath et al. | |
| 5,314,282 A | 5/1994 | Murphy et al. | |
| 5,324,377 A | 6/1994 | Davies | |
| 5,327,621 A | 7/1994 | Yasui et al. | |
| 5,333,562 A | 8/1994 | LeMaire et al. | |
| 5,361,483 A | 11/1994 | Rainville et al. | |
| 5,373,796 A | 12/1994 | Besemann | |
| 5,429,853 A | 7/1995 | Darrieux | |
| 5,445,693 A | 8/1995 | Vane | |
| 5,445,860 A | 8/1995 | Bova | |
| 5,445,861 A | 8/1995 | Newton et al. | |
| 5,466,506 A | 11/1995 | Freitas et al. | |
| 5,490,602 A | 2/1996 | Wilson et al. | |
| 5,549,771 A | 8/1996 | Brooker | |
| 5,580,514 A | 12/1996 | Farley | |
| 5,589,015 A | 12/1996 | Fusco et al. | |
| 5,589,243 A | 12/1996 | Day | |
| 5,624,622 A | 4/1997 | Boyce et al. | |
| 5,632,844 A | 5/1997 | Pate et al. | |
| 5,639,410 A | 6/1997 | Amaike et al. | |
| 5,642,679 A | 7/1997 | Monget et al. | |
| 5,667,859 A | 9/1997 | Boyce et al. | |
| 5,681,408 A | 10/1997 | Pate et al. | |
| 5,736,222 A | 4/1998 | Childress | |
| 5,741,574 A | 4/1998 | Boyce et al. | |
| 5,759,321 A | 6/1998 | Cahuzac | |
| 5,778,806 A | 7/1998 | Badillo | |
| 5,789,061 A | 8/1998 | Campbell et al. | |
| 5,827,383 A | 10/1998 | Campbell et al. | |
| 5,829,373 A | 11/1998 | Baxter | |
| 5,832,594 A | 11/1998 | Avila | |
| 5,834,082 A | 11/1998 | Day | |
| 5,862,975 A | 1/1999 | Childress | |
| 5,863,635 A | 1/1999 | Childress | |
| 5,868,886 A | 2/1999 | Alson et al. | |
| 5,869,165 A | 2/1999 | Rorabaugh et al. | |
| 5,873,973 A | 2/1999 | Koon et al. | |
| 5,876,540 A | 3/1999 | Pannell | |
| 5,876,652 A | 3/1999 | Rorabaugh et al. | |
| 5,876,832 A | 3/1999 | Pannell | |
| 5,882,756 A | 3/1999 | Alston et al. | |
| 5,882,765 A | 3/1999 | Pastureau et al. | |
| 5,916,469 A | 6/1999 | Scoles et al. | |
| 5,919,413 A | 7/1999 | Avila | |
| 5,935,475 A | 8/1999 | Scoles et al. | |
| 5,935,680 A | 8/1999 | Childress | |
| 5,935,698 A | 8/1999 | Pannell | |
| 5,941,185 A | 8/1999 | Selbach et al. | |
| 5,958,550 A | 9/1999 | Childress | |
| 5,968,639 A | 10/1999 | Childress | |
| 5,972,524 A | 10/1999 | Childress | |
| 5,980,665 A | 11/1999 | Childress | |
| 6,027,798 A | 2/2000 | Childress | |
| 6,051,089 A | 4/2000 | Palmer et al. | |
| 6,090,465 A | 7/2000 | Steele et al. | |
| 6,106,646 A | 8/2000 | Fairbanks | |
| 6,117,260 A | 9/2000 | Rossi | |
| 6,128,998 A | 10/2000 | Freitas et al. | |
| 6,132,859 A | 10/2000 | Jolly | |
| 6,139,942 A | 10/2000 | Hartness et al. | |
| 6,151,439 A | 11/2000 | Wainwright | |
| 6,187,411 B1 | 2/2001 | Palmer | |
| 6,190,602 B1 | 2/2001 | Blaney et al. | |
| 6,196,145 B1 | 3/2001 | Burgess | |
| 6,291,049 B1 | 9/2001 | Kunkel et al. | |
| 6,645,333 B2 * | 11/2003 | Johnson et al. | 156/92 |
| 7,105,071 B2 * | 9/2006 | Johnson et al. | 156/92 |
| 2001/0031350 A1 * | 10/2001 | Day et al. | 428/317.9 |
| 2002/0014302 A1 * | 2/2002 | Fanucci et al. | 156/179 |
| 2002/0069503 A1 | 6/2002 | Sentmanat | |
| 2002/0144767 A1 | 10/2002 | Johnson et al. | |
| 2002/0153084 A1 | 10/2002 | Johnson et al. | |

FOREIGN PATENT DOCUMENTS

| | | |
|---|---|---|
| GB | 1275705 | 5/1970 |
| GB | 2245862 | 1/1992 |
| JP | 5-200884 A | 10/1993 |
| JP | 63-60738 A | 3/1998 |
| WO | 92/00845 A1 | 1/1992 |
| WO | 98/08271 | 2/1998 |
| WO | 03/011576 A1 | 2/2003 |

* cited by examiner

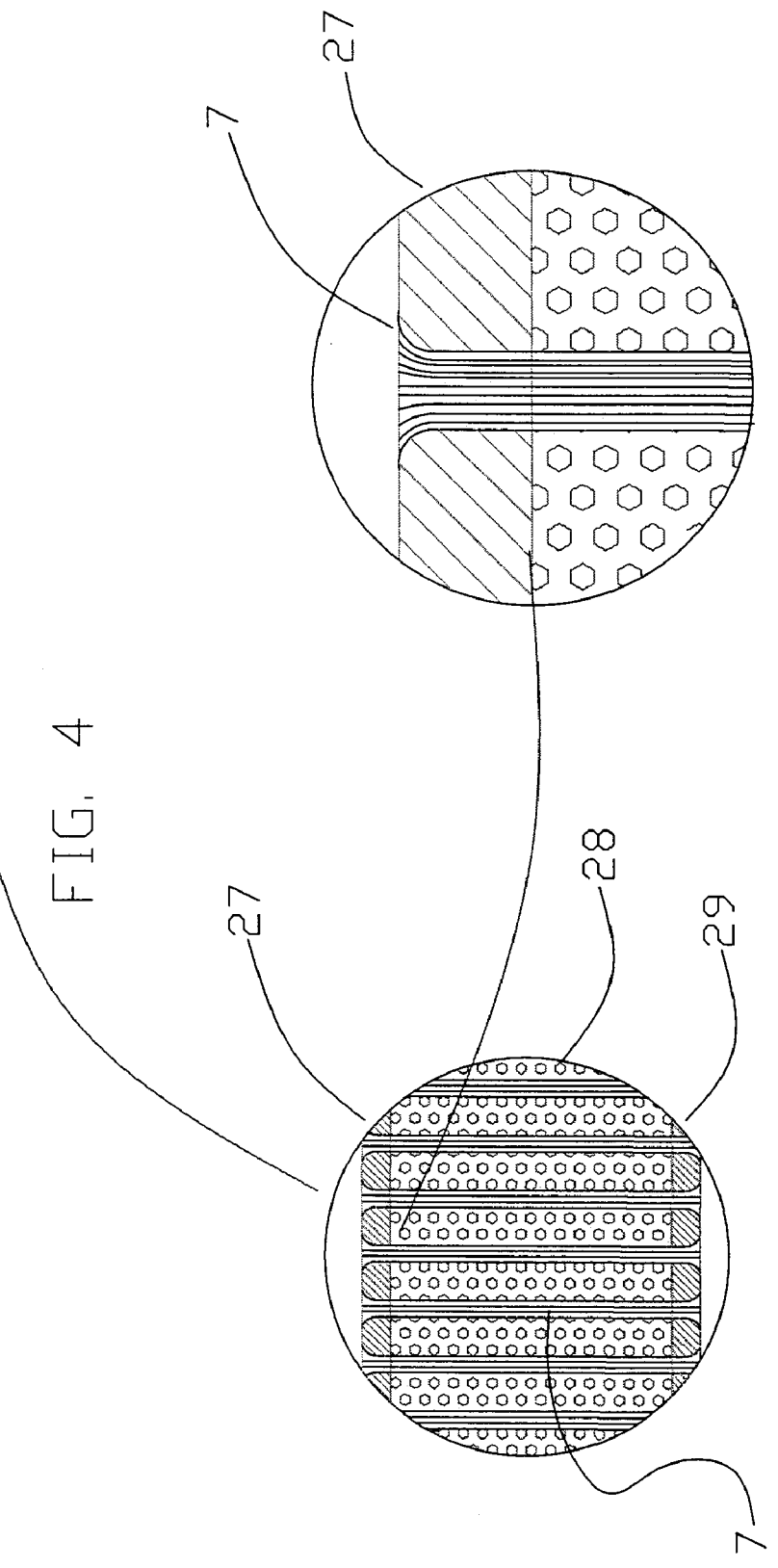
FIG. 4
FIG. 5
FIG. 6

METHOD OF INSERTING Z-AXIS REINFORCING FIBERS INTO A COMPOSITE LAMINATE

CROSS-REFERENCE TO RELATED APPLICATIONS

This patent application is a continuation application of U.S. patent application Ser. No. 11/530,859 filed Sep. 11, 2006, now U.S. Pat. No. 7,387,147, which is a continuation application of U.S. patent application Ser. No. 10/705,047 filed Nov. 10, 2003, now U.S. Pat. No. 7,105,071, which is a continuation-in-part application of U.S. patent application Ser. No. 09/922,053 filed Aug. 2, 2001, now U.S. Pat. No. 6,645,333, and claims the priority of provisional patent application 60/281,838 filed Apr. 6, 2001 and provisional patent application 60/293,939 filed May 29, 2001. All of the above applications are incorporated by reference herein as though set forth in full.

This invention was made with United States Government support under Cooperative Agreement 70NANB8H4059 awarded by NIST. The United States Government has certain rights in the invention.

BACKGROUND OF THE INVENTION

The invention relates to a method of producing a composite material and more specifically a process for incorporating z-axis fiber reinforcement into x-y axis composite material.

Traditional composite materials are made up of resin matrix material and a quantity of 2-dimensional fibers, continuous in the x-y axis directions, but laminated in layers to produce a material thickness. Composite material construction, wherein a fiber material such as glass fiber, carbon fiber, or aramid fiber is combined with a matrix material, such as thermoplastic or thermoset resins, is an example of a traditional 2-dimensional structure. The resulting structure is produced from "layering" of the 2-dimensional material (known as plies). Because the matrix is weaker in strength than the fiber (in many cases by at least an order of magnitude), the failure mechanism of these composites when test loaded toward their ultimate strength is a cracking or buckling or separation of the matrix material. When this occurs, the composite is known to have delaminated, or the layers of fiber material have separated.

Attempts have been made to lace or tie multiple layers of 2-dimensional composite materials together with z-axis directional fibers which tie all of the layers together. By doing this, delamination can be delayed or eliminated. Some techniques that have been used include 3-D braiding, 3-D weaving, and z-axis pinning. All of these methods have deficiencies, drawbacks and are expensive and labor intensive.

The Fusco et al U.S. Pat. No. 5,589,015 is directed to a method and system for inserting reinforcing pins in composite structure. Ultra sound energy is applied to the pins and pressure is applied simultaneously to insert the pins into the composite structure to join two laminates or reinforce a single composite structure.

The Childress U.S. Pat. No. 5,935,680 is directed to an interlaced z-axis pin sandwich structure that utilizes a plurality of z-axis pins that extend through the core and into each of the face sheets. The pins are arranged in an interlaced configuration off-normal to provide crack resistance around fasteners for connecting the composite structure to other structural elements in aerospace applications.

The Boyce et al U.S. Pat. No. 4,808,461 discloses a translaminar reinforcement structure that utilizes z-axis reinforcing elements and the method for driving these reinforcing elements into the composite structure as it is subjected to an elevated temperature and decomposes.

The Campbell et al U.S. Pat. No. 5,789,061 discloses a stiffener reinforced assembly and its method of manufacturing. The Boyce et al U.S. Pat. No. 5,667,859 also discloses the use of joining composite parts by including reinforcing elements that pass through the thickness of two composite adherents to be joined. The Campbell et al U.S. Pat. No. 5,827,383 also discloses a stiffener reinforcement assembly and its method of manufacturing.

Other patents that teach the use of tow members that are encapsulated within the foam core and which extend between the opposing face sheets to form a combined composite structure are the Boyce et al U.S. Pat. No. 5,624,622 and the Boyce et al U.S. Pat. No. 5,741,574. The Boyce et al U.S. Pat. No. 5,186,776 teaches a technique for translaminar reinforcement and the method includes heating and softening the composite laminates by ultrasonic energy and then inserting reinforcing fibers therein.

It is an object of the invention to provide a novel method of inserting an unstable reinforcing fiber into a composite laminate for z-axis reinforcement.

It is also an object of the invention to provide novel machinery for inserting an unstable z-axis reinforcing fiber into a composite laminate.

It is another object of the invention to provide a new type of composite material with substantial z-axis fiber reinforcement.

It is a further object of the invention to provide a novel method for producing layer quantities of 3-D bar stock, sheet and composite sandwich structure in a continuous, automated fashion.

SUMMARY OF THE INVENTION

The method of inserting an unstable reinforcing fiber into a composite laminate for z-axis reinforcement of the laminate requires a z-axis fiber deposition material. The side plates of the chamber formed between top and bottom plates into which is fed x-y axis material. The side plates of the chamber restrict the edges of x-y axis material. There would be multiple laterally spaced z-axis fiber deposition machines so that multiple z-axis fibers could be deposited into the x-y axis material at the same time. Each would have its own respective aperture in the top plate and the bottom plate and these would be aligned. Below each aperture in the bottom plate is an elongated solid rod having a tapered front tip. This rod is known as the "pathway deposition probe" (PDP). The PDP is rotated by a motor and then actuated upwardly through the aperture in the bottom plate, the x-y axis material and the aperture in the top plate. Mounted above each aperture in the top plate is a movable hollow tube whose initial position has its bottom end slightly inserted into the aperture in the top plate. Z-axis fiber bundles are contained on stationary rolls and are free to be drawn from the rolls continuously. The front end of each z-axis fiber bundle is threaded downwardly through one of the movable hollow tubes to a position adjacent its bottom end. There would be structure to resupply a predetermined length of z-axis fiber bundle to each movable hollow tube as a new length is needed.

After the PDP has been actuated upwardly to its upper most position, it is then retracted downwardly to its initial position and simultaneously, the movable hollow tube would travel downwardly through the hole created in the x-y axis material. While this is happening, the tip of the PDP would remain inserted into the bottom end of the movable hollow tube to insure a smooth entry of the hollow tube through the aperture in the x-y axis material created by the PDP. Each z-axis fiber deposition unit has a mechanism for preventing withdraw of z-axis fiber from the x-y axis material when the movable hollow tube is withdrawn upwardly. Once the movable hollow tube has been raised to its upper position, the top end of z-axis fiber that has been inserted into the x-y axis material is severed. This would complete a whole cycle. Simultaneously, across the width of the housing each of the other z-axis fiber deposition units would have completed their cycle. Next, the x-y axis material is stepped forwardly to provide a new position for the z-axis fibers to be deposited. Alternatively, the method could provide structure for stepping the housing rearwardly instead of stepping forwardly the x-y axis composite material.

After the x-y axis material has had the z-axis fibers deposited therein, it travels forwardly to a pultrusion die. Here the heated die cures the composite material of the plies and it exits the dies as a cured 3-D fiber composite material. The material is pulled from the die continuously by the alternate gripping edges of multiple grippers that are attached to motion control hydraulic cylinders.

It should be noted, the x-y material may be impregnated with resin prior to the insertion of 3-D fiber, may be impregnated with resin after the insertion of 3-D fiber, or may be impregnated with "pre-preg" resin at the factory where the x-y material was made and/or the 3-D fiber material was made. In the later case, no resin impregnation would be needed in the process, either before or after the insertion of the 3-D fiber material.

Another aspect of the invention involves a method of inserting a z-axis reinforcing fiber into a composite laminate for z-axis reinforcement of the composite laminate. The method includes providing at least one layer of material made up of x-axis fibers and y-axis fibers prior to incorporation of a z-axis reinforcing fiber into the at least one layer of material; the at least one layer having a top surface, a bottom surface and a predetermined thickness; providing an elongated pathway deposition device having a front tip, a shank portion, a rear end and a z-axis and positioning the front tip of the pathway deposition device in close proximity to one of the top or bottom surfaces of the at least one layer of material; providing an elongated moveable z-axis fiber insertion element having a front end, a rear end, an inner wall surface and a z-axis; positioning the front end of the moveable z-axis fiber insertion element in close proximity to the other of the top or bottom surfaces of the at least one layer of material; providing a z-axis reinforcing fiber bundle having a front end and inserting the front end of the z-axis reinforcing fiber bundle into the rear end of the moveable z-axis fiber insertion element until it travels substantially to the front end of the moveable z-axis fiber insertion element; inserting the pathway deposition device into and through the at least one layer of material a predetermined distance; temporarily securing the z-axis reinforcing fiber bundle to the inner wall of the z-axis fiber insertion element so that the z-axis reinforcing fiber bundle will move with the z-axis fiber insertion element; moving the z-axis fiber insertion element in the z-axis direction until the front end of the z-axis fiber insertion element meets with the tip of the pathway deposition device; moving the z-axis fiber insertion element and the z-axis reinforcing fiber bundle secured thereto through the entire thickness of the at least one layer of material while at the same time withdrawing the pathway deposition device from the at least one layer of material; unsecuring the z-axis reinforcing fiber bundle from the inner wall of the z-axis fiber insertion element and then withdrawing the z-axis fiber insertion element from the at least one layer of material, thus causing the z-axis reinforcing fiber bundle to remain within the at least one layer of material as the z-axis fiber insertion element is withdrawn; and severing the z-axis reinforcing fiber that is within the at least one layer of material from the z-axis reinforcing fiber bundle.

Another aspect of the invention involves a method of providing a z-axis reinforcing fiber into a composite laminate for z-axis reinforcement of the composite laminate. The method includes providing at least one layer of material made up of x-axis fibers and y-axis fibers prior to incorporation of a z-axis reinforcing fiber into the at least one layer of material; the at least one layer having a top surface, a bottom surface and a predetermined thickness; providing an elongated pathway deposition device having a front tip, a shank portion, a rear end and a z-axis and providing the front tip of the pathway deposition device in close proximity to one of the top or bottom surfaces of the at least one layer of material; providing an elongated z-axis fiber insertion element having a front end, a rear end, an inner wall surface and a z-axis and providing the front end of the moveable z-axis fiber insertion element in close proximity to the other of the top or bottom surfaces of the at least one layer of material; providing a z-axis reinforcing fiber bundle having a front end and inserting the front end of the z-axis reinforcing fiber bundle into the rear end of the z-axis fiber insertion element until it travels substantially to the front end of the z-axis fiber insertion element; moving the at least one layer of material so that the pathway deposition device is provided into and through the at least one layer of material a predetermined distance; moving at least one of the z-axis fiber insertion element and the pathway deposition device in the z-axis direction so that the front end of the z-axis fiber insertion element and the tip of the pathway deposition device meet; moving the at least one layer of material so that z-axis reinforcing fiber bundle and the z-axis fiber insertion element are disposed through the entire thickness of the at least one layer of material; separating the z-axis fiber insertion element and the at least one layer of material, thus causing the z-axis reinforcing fiber bundle to remain within the at least one layer of material; and severing the z-axis reinforcing fiber that is within the at least one layer of material from the z-axis reinforcing fiber bundle.

A further aspect of the invention involves a method of inserting a z-axis reinforcing fiber into a composite laminate for z-axis reinforcement of the composite laminate. The method includes providing at least one layer of composite laminate material prior to incorporation of a z-axis reinforcing fiber into the at least one layer of material; the at least one layer having a top surface, a bottom surface and a predetermined thickness; providing an elongated pathway deposition device having a front tip, a body portion, a rear end and a z-axis and providing the front tip of the pathway deposition device in close proximity to one of the top or bottom surfaces of the at least one layer of material; providing an elongated moveable z-axis fiber insertion element having a front end, a rear end, and a z-axis and providing the front end of the moveable z-axis fiber insertion element in close proximity to the other of the top or bottom surfaces of the at least one layer of material; providing a z-axis reinforcing fiber bundle in the moveable z-axis fiber insertion element; inserting the pathway deposition device into and through the at least one layer of material a predetermined distance; moving at least one of the pathway deposition device and the z-axis fiber insertion element in the z-axis direction until the front end of the z-axis fiber insertion element meets with the tip of the pathway deposition device; moving the z-axis fiber insertion element and the z-axis reinforcing fiber bundle through the entire thickness of the at least one layer of material while at the same time withdrawing the pathway deposition device from the at least one layer of material; withdrawing the z-axis fiber insertion element from the at least one layer of material, thus causing the z-axis reinforcing fiber bundle to remain within the at least one layer of material as the z-axis fiber insertion element is withdrawn; and severing the z-axis reinforcing fiber from the z-axis reinforcing fiber bundle.

A further aspect of the invention involves a method of inserting a z-x direction reinforcing fiber or z-y direction reinforcing fiber (hereinafter z-x/y) into a composite laminate for z-x/y directional reinforcement of the composite laminate. The method includes providing at least one layer of composite laminate material prior to incorporation of a z-x/y directional reinforcing fiber into the at least one layer of material; the at least one layer having a top surface, a bottom surface and a predetermined thickness; providing an elongated pathway deposition device oriented in a z-x/y direction and having a front tip, a body portion, a rear end and a z-x/y axis, providing the front tip of the pathway deposition device in close proximity to one of the top or bottom surfaces of the at least one layer of material; providing an elongated moveable z-x/y directional fiber insertion element oriented in a z-x/y direction and having a front end, a rear end, and a z-x/y axis, providing the front end of the moveable z-x/y axis fiber insertion element in close proximity to the other of the top or bottom surfaces of the at least one layer of material; providing a z-x/y directional reinforcing fiber bundle in the moveable z-x/y directional fiber insertion element; inserting the pathway deposition device into and through the at least one layer of material a predetermined distance in the z-x/y direction; moving at least one of the pathway deposition device and the z-x/y directional fiber insertion element in the z-x/y direction until the front end of the z-x/y directional fiber insertion element meets with the tip of the pathway deposition device; moving the z-x/y directional insertion element and the z-x/y directional fiber bundle through the entire thickness of the at least one layer of material while at the same time withdrawing the pathway deposition device from the at least one layer of material; withdrawing the z-x/y directional fiber insertion element from the at least one layer of material, thus causing the z-x/y directional reinforcing fiber bundle to remain within the at least one layer of material in the z-x/y direction as the z-x/y directional fiber insertion element is withdrawn; and severing the z-x/y directional reinforcing fiber from the z-x/y directional reinforcing fiber bundle.

DESCRIPTION OF THE DRAWINGS

FIG. 4 is a schematic partial cross section view illustrating a sandwich structure having a core covered on its top and bottom surface with respective skins formed of a x-y axis fiber material;

FIG. 5 is an enlarged schematic cross sectional view taken along lines 5-5 of FIG. 4;

FIG. 6 is an enlarged schematic cross sectional view taken along lines 6-6 of FIG. 5;

DESCRIPTION OF THE PREFERRED EMBODIMENT

The method of inserting z-axis reinforcing fibers into a composite laminate will now be described by referring to FIGS. 1-6 of the drawings.

Figure 1:
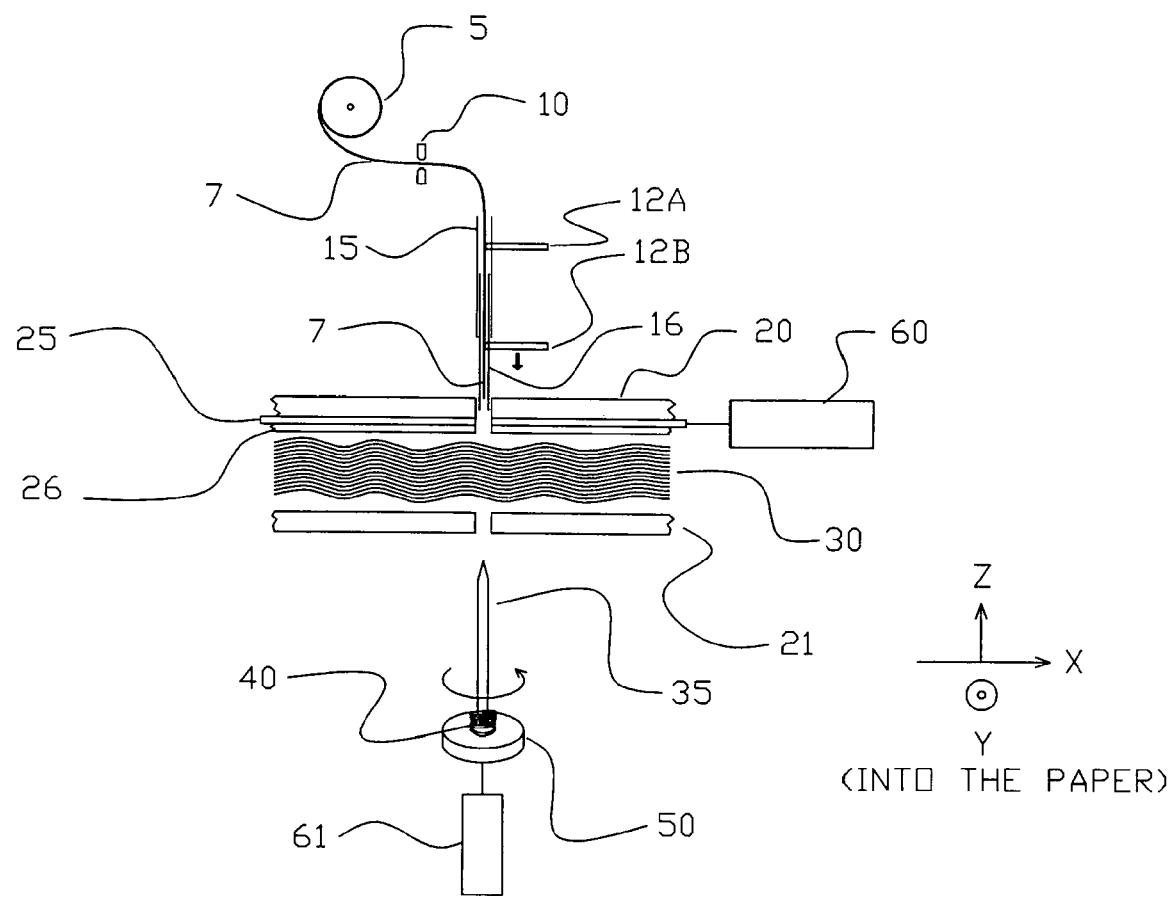
FIG. 1 is a schematic side elevation view of a z-axis fiber deposition unit.

FIG. 1 shows a schematic elevation view of the novel z-axis fiber deposition process and the associated machinery. The key element of only one z-axis fiber deposition unit is illustrated in this figure. Following a description of FIG. 1, a more detailed, expanded description of multiple z-axis fiber deposition components will be discussed.

In FIG. 1, the cross section of a typical x-y axis material is identified by numeral 30. Material 30 is a continuously traveling laminate of x-y axis material. The direction of pultrusion and the continuous processing is defined as being in the x-axis direction and is left-to-right. The y-axis direction is into the paper. The z-axis direction is from top-to-bottom, through 3-D material 30. Only a few layers, or "plies" of x-y axis material 30 are shown, although clearly, additional layers could be shown. A single layer of material 30 is made up of x-axis material and y-axis material, produced by other processes prior to incorporation into the z-axis fiber deposition process. This x-y axis material could be woven glass fiber or stitched glass fiber or a combination of each, or it could be mat or unidirectional woving, or could be other fiber such as carbon or aramid. The material 30 may also be rovings.

Material 30 is contained in the z-axis direction by a chamber in the housing shown only by the top and bottom plates 20 and 21, respectfully. The side plates of the housing, not shown, restrict the edges of material 30. Since there are multiple z-axis deposition points along the y-axis, and since FIG. 1 shows only one of these points, the edges of the chamber in the containment housing and the x-y axis material are not shown. Plates 20 and 21 are pre-spaced such that a very compact set of layers 30 are drawn through the housing, compressing the x-y axis material 30 to its nearly final z-axis directional compression prior to receiving the z-axis fiber or entering the pultrusion die. Material 30 may be impregnated with resin material and if thermoset, may be debulked prior to entering the chamber in the containment housing defined by plates 20 and 21.

As stated earlier, material 30 could also be sandwich structure, without changing the operation or process. As shown in FIG. 1, the material 30 is a stack of layers of x-y axis fiber material, which, after deposition of the z-axis directional fiber, will be processed into the quasi-isotropic bar stock. If the material 30 is 1 inch thick (for example), there might be 36 layers of x-y axis material making up the 1-inch thickness. It would be a simple matter of construction to substitute for the middle layers of x-y axis material, a core material 28, such as foam plastic, polyisocyanurate foam, honeycomb material, or balsa wood (see FIGS. 4-6). These core materials are low density and are used in sandwich structure construction. In this manner, material 30 could have six layers of x-y axis material on the top, a core material of 0.75 inches in thickness and six layers of x-y axis material on the bottom. The z-axis fiber deposition method described herein would be identical, whether the material 30 was 100% x-y axis fiber material or a sandwich material having a core and top 27 and bottom 29 "skin" material.

The key elements of the z-axis fiber deposition mechanism are shown in FIG. 1, although all of the details of how certain mechanisms are supported or actuated are not shown. The first step of the process has the material 30 being drawn into the chamber in the containment housing between upper and lower surfaces 20 and 21, respectfully. Material 30 is stopped because the machinery moves synchronously to the pultrusion speed. This allows the "pathway deposition probe" (PDP) 35 to be inserted through the material 30. Alternatively, the material could be moving continuously and the deposition process could be gantry and synchronous with the pultrusion speed. The PDP 35 is an elongated solid rod having a tapered front tip, a shank portion, and a rear end. PDP 35 is first rotated by a motor 50 and then actuated upwardly by way of an actuator 61.

Then the process begins in which a fiber bundle, shown by the single line 7, is deposited in the stack of x-y axis material 30. Although the fiber bundle is shown as a single line, in fact it could be a glass, carbon, or other fiber bundle containing hundreds or even thousands of continuous fiber filaments. This process will be referred to as the z-axis fiber deposition process. The z-axis fiber bundle 7 is contained on a stationary roll 5 which is free to be drawn continuously from the roll 5. The fiber bundle is fed through a guidance bushing 10 and through two tubes, one of which is stationary outer tube 15 and the other a movable tube 16. Stationary outer tube 15 and movable inner tube 16 are concentric with very close tolerances and are both penetrated at two locations to accept a fiber clamp 12A and a fiber clamp l2B. Fiber clamp 12A is by definition, stationary, as it penetrates the stationary outer tube 15. Fiber clamp 12B is by definition, movable, as it must move with the movement of the mechanism in the z-axis direction of the moveable inner tube 16. Moveable fiber clamp l2B may or may not be extended when tube 16 is moving. The actuation mechanism of clamp 12B is independent of the actuation mechanism for tube 16, both of which are shown in FIG. 1 for clarity. The purpose of fiber clamps 12A and 12B is to provide positive clamping of the fiber bundle to the interior of tubes 15 and 16, respectively, at different times and for different purposes.

Once the PDP 35 has rotated, has been actuated in the z-axis direction, and has fully penetrated the x-y axis fiber layers 30, the PDP 35 is not yet touching the outer movable tube 16, but has passed completely through material 30. At this time, the PDP 35 has stopped rotating.

As mentioned previously, the rotation of PDP 35 assists in the penetration of material 30 with minimum force and minimum fiber damage in the x-y axis material 30. The next step in the process is as follows: fiber clamp 12A is unclamped and fiber clamp 12B is clamped. By actuating fiber clamp 12B, in the clamped location, fiber bundle 7 is secured to the inner wall of moveable tube 16 and allows fiber bundle 7 to move with tube 16. In an alternative embodiment, the fiber bundle 7 may not be secured to the moveable tube 16 when the tube is moved into the material 30. For example, but not by way of limitation, the PDP 35 and tube 16 may first create a fiber bundle path in the material 30. Once the fiber bundle path is created, the fiber bundle 7 may be inserted into this fiber bundle path, preferably through the tube 17 while the tube 17 is in the fiber bundle path. The tube 17 may then be removed from the fiber bundle path, leaving the fiber bundle 7 in the fiber bundle path in the material 30. As the tube 17 is removed, the fiber bundle 7 may be retained by the PDP 35 or another retaining mechanism to prevent the fiber bundle 7 from accidentally being removed from the fiber bundle path with removal of the tube 17.

Once clamp 12B has secured the fiber bundle 7 to movable inner tube 16, a mechanism (not shown) moves inner tube 16 downward in the z-axis direction until the bottom end of the tube 16 makes contact with the outside of the PDP 35 (which has already penetrated the x-y axis material 30) but at this time is not rotating. Alternatively, the meeting of the tube 16 and PDP 35 may occur without the tube 16 and PDP 35 making contact instead of the meeting of the tube 16 and PDP 35 occurring with the tube 16 and PDP 35 making contact as described above.

Next, the mechanism that moves inner tube 16, moves fiber bundle 7 and the PDP 35 through the entire x-y axis material 30. PDP 35 had created a pathway for inner tube 16 to be inserted through material 30. A certain amount of low actuation force on the PDP 35 insures that the inner tube 16 stays intimate and in contact with the PDP 35. This technique insures a smooth entry of tube 16 and the clamped fiber bundle 7 through the x-y axis material 30. Fiber bundle 7 is pulled off the spool 5 by this process.

Next fiber clamp 12B is released into the unclamped position and fiber clamp l2A is actuated into a clamped position. In this way, fiber clamp 12A secures fiber bundle 7 against the interior wall of stationary tube 15. This ensures that the fiber bundle 7 remains stationary and deposited in the x-y axis material 30. Following this, moveable inner tube 16 is withdrawn from the x-y axis material 30 and actuated upwardly in the z-axis direction back to the original position shown in FIG. 1. When this step is done fiber bundle 7 does not move. Fiber bundle 7 remains as a fully deposited fiber bundle in the z-axis direction. Next, fiber bundle 7 is sheared off at the top of the x-y axis material 30 by a shear plate 25 and 26. The stationary part of shear plate 26 never moves. The movable portion 25 is actuated by an actuator 60. This cuts fiber bundle 7, much like a scissors cut, and allows the fiber bundle 7, which is carried by spool 5, to be separated from the z-axis fiber deposited bundle (Alternatively, the z-axis fiber may be severed from the fiber bundle 7 prior to insertion instead of after insertion.). This allows a preparation for the second z-axis fiber deposition. The preparation includes adjusting the end of the fiber bundle 7 relative to the end of shear plate 26. As shown in FIG. 1, the end of fiber bundle 7 is drawn slightly inwardly from the bottom end of tube 16. This is necessary to allow the point on the tip of PDP 35 to enter tube 16 without fiber being caught between the contact points of inner tube 16 and PDP 35. This is accomplished as follows:

Once sheer plate 25 has cut the deposited z-axis fiber from fiber bundle 7, the end of fiber bundle 7 is slightly extended below the inner tube 16. Next, fiber clamp 12A is released and fiber clamp 12B is actuated and clamped. Inner tube 16 is actuated further upward in the z-axis direction as shown in FIG. 1 until the end of fiber bundle 7 is in the same relative position as that shown in FIG. 1. Next, clamp 12A is actuated and clamped and clamp 12B is released, unclamped. Following this, inner tube 16 is moved downward in the z-axis direction to the position shown in FIG. 1, thus that the relative position of the end of moveable inner tube 16 and the end of fiber bundle 7 is as shown in FIG. 1. The cycle is now set to be repeated.

All of the previously described operation can occur rapidly. Several units of the device as illustrated in FIG. 1 are installed side-by-side. The movement of an entire housing containing all of the devices of FIG. 1 occurs with the x-y axis material 30 and the plates 25 and 26 remaining stationary. In this way, for example, while the material 30 is stopped, an extra z-axis fiber can be deposited between the locations of two z-axis fibers deposited on the first cycle. A high number of z-axis fiber bundles in one row, with material 30 stationary, can in fact be deposited. Once a row, which is defined as the deposited z-axis fibers lineal in the y direction, is completed, material 30 can be moved relative to the machinery of FIG. 1 and a second row of z-axis fibers can be deposited. This new row can have the same pattern or a staggered pattern, as required.

One other device in FIG. 1 requires mentioning. Spring 40, located at the base PDP 35 and between the PDP and the motor 50 has a special purpose. When inner tube 16 contacts PDP 35, and then subsequently pushes PDP 35 back through the layers of x-y axis material 30, a flaring in the end of the tube can occur, if the relative force between the two exceeds a certain value. The flaring of the end of the tube 16 will result in failure of the mechanism. Spring 40 prevents this excess differential force, thus resulting in no flaring of the end of tube 16.

Although the material 30 has been described as being within the x-y plane and the tube 16 and PDP 35 moving in the z direction, alternatively, the method may include the material 30 moving in the z direction for providing the z-axis reinforcing fiber into the material 30 instead of or in addition to the tube 16 and PDP 35 moving in the z direction. For example, the method may include providing an elongated pathway deposition device 35 in close proximity to one of the top or bottom surfaces of the material 30; providing an elongated z-axis fiber insertion element 16 in close proximity to the other of the top or bottom surfaces of the material 30; providing a z-axis reinforcing fiber bundle 7 into the z-axis fiber insertion element 16; moving the material 30 so that the pathway deposition device 35 is provided into and through the material 30 a predetermined distance; moving at least one of the z-axis fiber insertion element 16 and the pathway deposition device 35 in the z-axis direction so that the front end of the z-axis fiber insertion element 16 and the tip of the pathway deposition device meet 35; moving the material 30 so that z-axis reinforcing fiber bundle 7 and the z-axis fiber insertion element 16 are disposed through the entire thickness of the material 30; separating the z-axis fiber insertion element 16 and the material 30, thus causing the z-axis reinforcing fiber bundle 7 to remain within the material 30; and severing the z-axis reinforcing fiber that is within the material 30 from the z-axis reinforcing fiber bundle 7.

Figure 2:
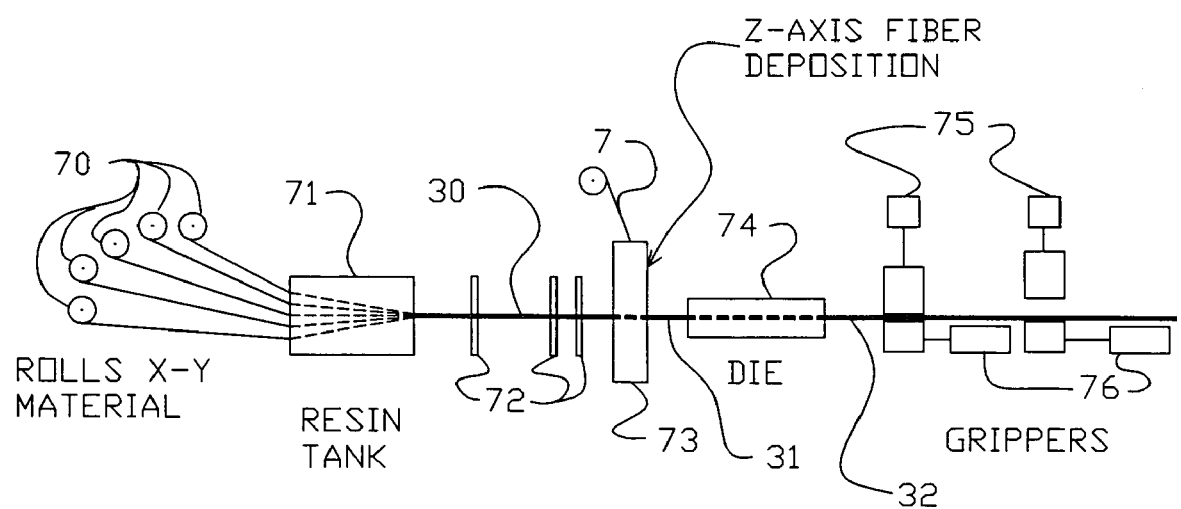
FIG. 2 is a schematic side elevation view of a z-axis fiber deposition units integrated with the pultrusion process.

FIG. 2 is a schematic side elevation view of the z-axis fiber deposition machinery integrated with the pultrusion process. The 2-D layers of x-y axis material 30 are stored on rolls 70. They are pulled through a resin tank 31 where the 2D material is impregnated with resin. They are then pulled through debulking bushings 72 where, sequentially, the plies are stacked and each succeeding bushing 72 squeezes progressively a little more resin out of the stack of x-y axis material 30 as the x-y axis material 30 progresses toward the z-axis fiber deposition machine 73. Once through machine 73, the 3-D fiber composite material, now identified as numeral 31 since it has z-axis fibers deposited in it, progresses to pultrusion die 74. Here a heated die 74 cures the 3-D fiber composite material 31 on the fly, and it exits the die 74 as cured 3D fiber composite material 32. The material 32 is pulled from the die 74 continuously by the alternate gripping action of two grippers 75 that are attached to motion control hydraulic cylinders 76. Cylinders 76 are CNC type cylinders and can accurately position and time the material 30 for z-axis deposition.

Figure 7:
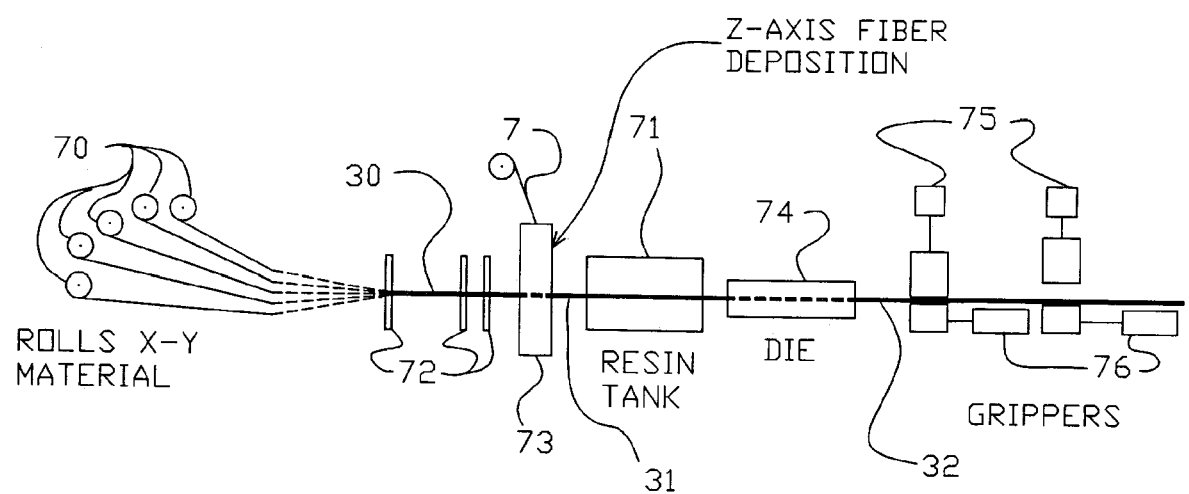
FIG. 7 is a schematic side elevation view of a z-axis fiber deposition unit integrated with the pultrusion process, where x-y material is impregnated with resin after the insertion of 3-D fiber.

Although the x-y material 30 has be described as being impregnated with resin prior to the insertion of 3-D fiber, with reference to FIG. 7, the resin tank 71 may be located downline from the z-axis fiber deposition machine 73 so that 3-D composite fiber material 31 is impregnated with resin after the insertion of 3-D fiber. Alternatively, the x-y material 30 may be impregnated with "pre-preg" resin at the factory where the x-y material 30 was made and/or the 3-D fiber material was made. In this case, no resin impregnation would be needed in the process, either before or after the insertion of the 3-D fiber material.

Figure 3:
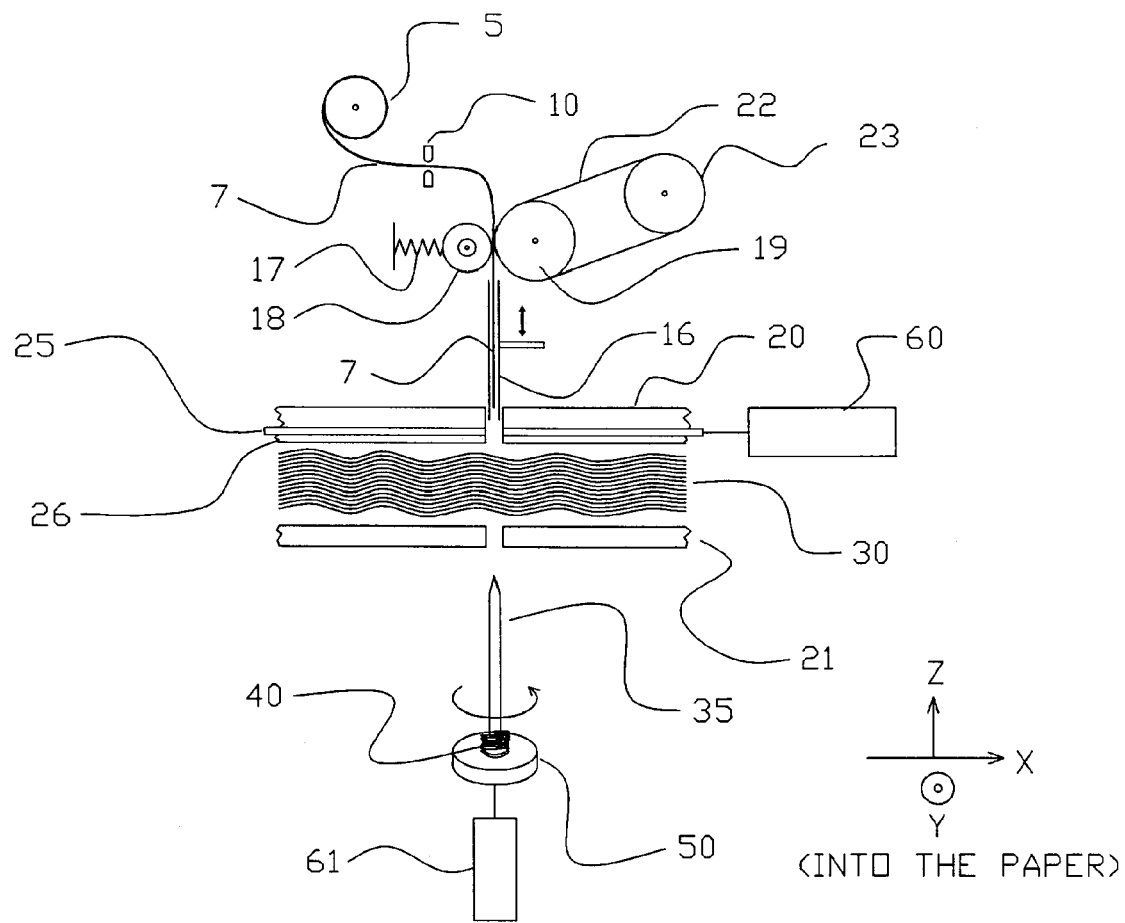
FIG. 3 is a schematic side elevation view of a first alternative embodiment of the z-axis fiber deposition unit.

An alternative to the feed mechanism described earlier in FIG. 1 and depicted by clamps 12A and I2B, and the outer tube 15 and inner tube 16, can be replaced by the feed mechanism illustrated in FIG. 3. This feed mechanism requires a more sophisticated motion control than the clamp system of FIG. 1, as will be evident in the description below.

The components of FIG. 3 shown above the carrier plate 20 replace the components of FIG. 1 shown above the carrier plate 20. The key new components are a tube 16, a urethane reel 19, an idler bearing 18, a spring 17, a drive belt 22 and a CNC type motion control motor 23. All of these components are intimately connected to a frame (not shown), which is driven through carrier plates 20 and 21, by a CNC-type motor and ball screw (also not shown). In this way, all of the components 16, 19, 18, 17, 22 and 23 move together as a synchronous unit.

The embodiment illustrated in FIG. 3 has the same fiber roll 5, fiber tow or bundle 7, and guidance bushing 10. Idler bearing 18 and urethane wheel 19 provide a positive clamping of the fiber bundle 7. Spring 17, assures a side force of known quantity and clamps the fiber bundle 7. When motion control motor 23 is in a locked position, not rotated, fiber bundle 7 is clamped and cannot be moved. When motor 23 is rotated, fiber bundle 7 moves relative to tube 16, since the position of tube 16 is always the same as the other components 19, 18, 17, 22 and 23 of FIG. 3. In this way, fiber bundle 7 can either be clamped so that it can not move inside tube 16 or it can be moved inside tube 16 by rotation of the motion control motor 23.

It should now be apparent that the mechanisms illustrated in FIG. 3 can substitute for those identified in FIG. 1. When tube 16, with fiber bundle 7 clamped, is moved by a CNC motor (not shown) through the x-y axis material 30, motor 23 is not rotated. However, when tube 16 is drawn from the x-y axis material 30, motor 23 is rotated at the exact rate of speed as the withdraw of PDP 35. This can be accomplished with present day sophisticated motion control hardware and software. In doing this, fiber bundle 7, stays stationary relative to x-y axis material 30, even though tube 16 is being withdrawn.

The advantage of the mechanisms in FIG. 3, although they provide identical functions to their counterparts in FIG. 1, is that the speed of the process can improve by eliminating the alternative clamping of clamps 12A and 12B. Nevertheless, either set of mechanisms is viable for the disclosed invention.

Figure 8:
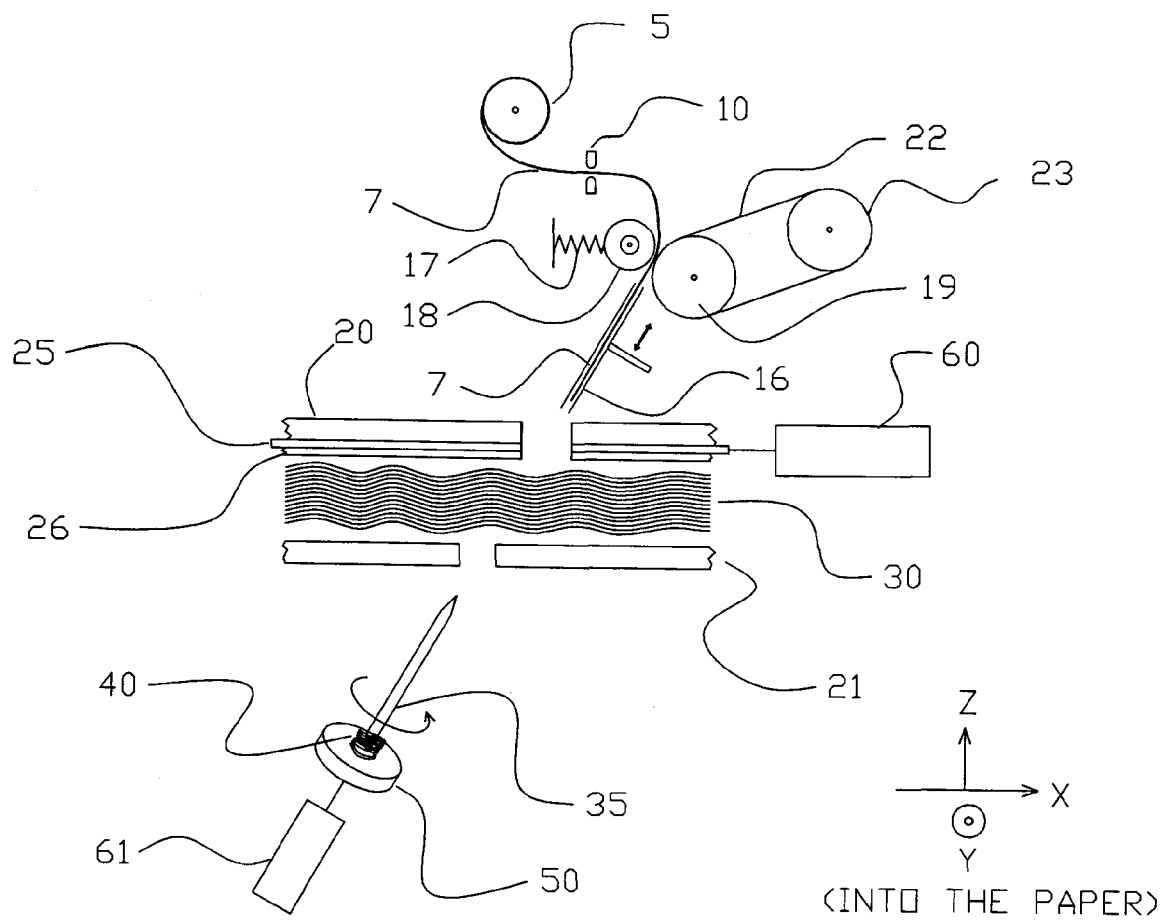
FIG. 8 is a schematic side elevation view of another embodiment of fiber deposition unit where fibers are deposited in the x-y composite material in the z-x/y direction.

FIG. 8 is a schematic side elevation view of another embodiment of a fiber deposition unit where fibers 7 are deposited in the x-y composite material 30 in the z-x/y direction. As used herein, z-x/y direction reinforcing fiber or depositing fiber 7 in the z-x/y direction means that the fiber 7 may be deposited in the x-y material 30 in the z-x direction, in the z-y direction, or the z-x-y direction. The fiber deposition unit illustrated in FIG. 8 is similar to the z-axis fiber deposition unit described above with respect to FIG. 3 except the fiber deposition equipment located above the x-y composite material 30 (e.g., tube 16, urethane reel 19, idler bearing 18, spring 17, drive belt 22, CNC type motion control motor 23) is generally offset along the x direction (or the y direction or both the x and y direction) with respect to the fiber deposition equipment located below the x-y composite material (e.g., PDP 35, spring 40, motor 50, actuator 61). Further, some of the fiber deposition unit equipment is disposed at an angle in the z-x/y direction (e.g., tube 16 with fiber 7, PDP 35). Deposition of the fibers 7 in the x-y material 30 occurs in the same manner as that described above with respect to FIG. 3, except the fibers 7 are deposited at an angle in the x-y material 30 in the z-x/y direction (i.e., through the one or more layers of the x-y material, but not perpendicular to the z axis). Orienting the fibers 7 at an angle in the z-x/y direction in the x-y material 30 not only reinforces the strength of the composite material in the z direction, but increases the shear strength, shear modulus, moment of inertia of the composite material. This makes the resulting composite ideal for applications requiring flexural stiffness and shear stiffness.

What is claimed is:

1. A method of producing an un-impregnated, un-clinched, un-cured 3-D fiber composite material or preform, comprising;

providing at least one layer of material made up of x-axis fibers and y-axis fibers, said at least one layer includes a top surface, a bottom surface and a predetermined thickness;

inserting z-axis reinforcing fiber into the at least one layer of material made up of x-axis fibers and y-axis fibers prior to resin impregnation, clinching, and curing so as to produce an un-impregnated, un-clinched, un-cured 3-D fiber composite material or preform, said inserting z-axis reinforcing fiber into the at least one layer of material made up of x-axis fibers and y-axis includes providing an elongated pathway deposition device having a front tip, a shank portion, a rear end and a z-axis and positioning said front tip of said pathway deposition device in close proximity to one of said top or bottom surfaces of said at least one layer of material; providing an elongated moveable z-axis fiber insertion element having a front end, a rear end, an inner wall surface and a z-axis; positioning said front end of said moveable z-axis fiber insertion element in close proximity to said other of said top or bottom surfaces of said at least one layer of material; providing a z-axis reinforcing fiber bundle having a front end and inserting said front end of said z-axis reinforcing fiber bundle into said rear end of said moveable z-axis fiber insertion element until it travels substantially to said front end of said moveable z-axis fiber insertion element; inserting said pathway deposition device into and through said at least one layer of material a predetermined distance; temporarily securing said z-axis reinforcing fiber bundle to said inner wall of said z-axis fiber insertion element so that said z-axis reinforcing fiber bundle will move with said z-axis fiber insertion element; moving said z-axis fiber insertion element in the z-axis direction until said front end of said z-axis fiber insertion element meets with the tip of said pathway deposition device; moving said z-axis fiber insertion element and said z-axis reinforcing fiber bundle secured thereto through the entire thickness of said at least one layer of material while at the same time withdrawing said pathway deposition device from said at least one layer of material; unsecuring said z-axis reinforcing fiber bundle from said inner wall of said z-axis fiber insertion element and then withdrawing said z-axis fiber insertion element from said at least one layer of material, thus causing said z-axis reinforcing fiber bundle to remain within said at least one layer of material as said z-axis fiber insertion element is withdrawn; and severing the z-axis reinforcing fiber that is within said at least one layer of material from said z-axis reinforcing fiber bundle.

2. The method of claim 1, wherein inserting z-axis reinforcing fiber into the at least one layer of material made up of x-axis fibers and y-axis fibers includes inserting z-axis reinforcing fiber into the at least one layer of material made up of x-axis fibers and y-axis fibers using z-axis fiber deposition machinery including means for deposition of the z-axis reinforcing fiber.

3. The method of claim 1, wherein providing at least one layer of material made up of x-axis fibers and y-axis fibers includes providing the at least one layer of material made up of x-axis fibers and y-axis fibers on rolls that are pulled into position for the z-axis reinforcing fiber insertion step.

4. The method of claim 1, wherein inserting z-axis reinforcing fiber into the at least one layer of material made up of x-axis fibers and y-axis fibers includes inserting z-axis reinforcing fiber into the at least one layer of material made up of x-axis fibers and y-axis fibers using z-axis fiber deposition machinery including a pathway deposition device to depose the z-axis reinforcing fiber into the at least one layer of material made up of x-axis fibers and y-axis fibers.

5. The method of claim 4, wherein said pathway deposition device is spinning during insertion into said at least one layer of material.

6. The method of claim 1, further comprising stepping said at least one layer of material forwardly for insertion of additional z-axis reinforcing fibers into said at least one layer of material.

7. The method of claim 1, further comprising first moving said at least one layer of material forwardly and then making said at least one layer of material stationary in order to deposit additional z-axis reinforcing fiber into said at least one layer of material.

8. The method of claim 1, further comprising stepping said at least one layer of material forwardly and depositing said additional z-axis reinforcing fiber into said at least one layer of material synchronously.

9. The method of claim 1, wherein inserting z-axis reinforcing fiber into the at least one layer of material made up of x-axis fibers and y-axis fibers includes inserting z-axis reinforcing fiber into the at least one layer of material made up of x-axis fibers and y-axis fibers using z-axis fiber deposition machinery, and the method further includes stepping rearwardly the z-axis fiber deposition machinery that preforms the operations of inserting a z-axis reinforcing fiber into a composite laminate for z-axis reinforcement while said at least one layer of material remains stationary.

10. The method of claim 1, wherein said at least one layer of material includes multiple layers of material stacked upon each other and into which z-axis reinforcing fiber are inserted.

11. The method of claim 10, wherein some of said layers of material are vertically spaced from each other by a core layer of material.

12. The method of claim 11, wherein said core layer of material is made of at least one of foam plastic and polyisocyanurate foam.

13. The method of claim 11, wherein said core layer of material is made of balsa wood.

14. The method of claim 11, wherein said core layer of material is made of honeycomb material.

15. The method of claim 1, wherein said z-axis reinforcing fiber bundle is made of glass fibers.

16. The method of claim 1, wherein said z-axis reinforcing fiber bundle is made of carbon fibers.

17. The method of claim 1, wherein said z-axis reinforcing fiber bundle is made of aramid fibers.

18. The method of claim 1, wherein said least one layer of material is made up of rovings.

* * * * *